United States Statutory Invention Registration [19]

[11] Reg. Number: H911

Tuttle

[43] Published: May 7, 1991

[54] FIBER OPTIC LINK FOR DETECTING MECHANICAL VIBRATION IN THE PRESENCE OF AN ELECTROMAGNETIC FIELD

[75] Inventor: John E. B. Tuttle, Falls Church, Va.

[73] Assignee: The United States of America as represented by the Secretary of the Army, Washington, D.C.

[21] Appl. No.: 386,379

[22] Filed: Jul. 26, 1989

[51] Int. Cl.[5] ..... G01L 5/14

[52] U.S. Cl. ..... 73/167; 340/870.29; 340/870.30

[58] Field of Search ..... 73/167; 340/870.28, 340/870.29, 870.30

[56] References Cited

U.S. PATENT DOCUMENTS

| | | | |
|---|---|---|---|
| 4,065,758 | 12/1977 | Barbier et al. | 340/870.29 |
| 4,357,606 | 11/1982 | Fortescue | 340/870.29 |
| 4,375,168 | 3/1983 | Swenson et al. | 73/658 |
| 4,408,307 | 10/1983 | Harris | 340/870.28 |
| 4,651,571 | 3/1987 | McGlade | 340/870.28 |
| 4,866,436 | 9/1989 | Kordts et al. | 340/870.28 |
| 4,879,760 | 11/1989 | Kroll et al. | 340/870.29 |

FOREIGN PATENT DOCUMENTS

| | | | |
|---|---|---|---|
| 0242090 | 10/1987 | European Pat. Off. | 340/870.29 |
| 0139555 | 12/1978 | Japan | 340/870.28 |
| 0146153 | 8/1983 | Japan | 340/870.28 |

OTHER PUBLICATIONS

Moulton, C. H., "Light Pulse System Shrinks High-Voltage Protection Device", Electronics, pp. 71–75, (May 17, 1965).

"Optical Transmission System for Meteorological Observation from a Balloon in the Sky", Sumitomo Electric Technical Review, No. 21, (Jan. 1982).

Richter, J. P., "Fiber Optic Telemetry System for LLL High Voltage Test Stand", Proceedings of the 7th Symposium on Eng. Problems of Fusion Research, Knoxville, Tenn., (Oct. 25–28, 1977).

*Primary Examiner*—Linda J. Wallace

*Attorney, Agent, or Firm*—Saul Elbaum; Guy M. Miller

[57] ABSTRACT

An apparatus for detecting mechanical vibration in the presence of an electromagnetic pulse, which is of particular use in the testing of land mines. An optical fiber link is provided between the device under test and a remote data collection station. A vibration sensor and optical transmitter are secured to the device under test, while an optical receiver and event latch are present at the other end of the fiber link at the data collection station.

7 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 3
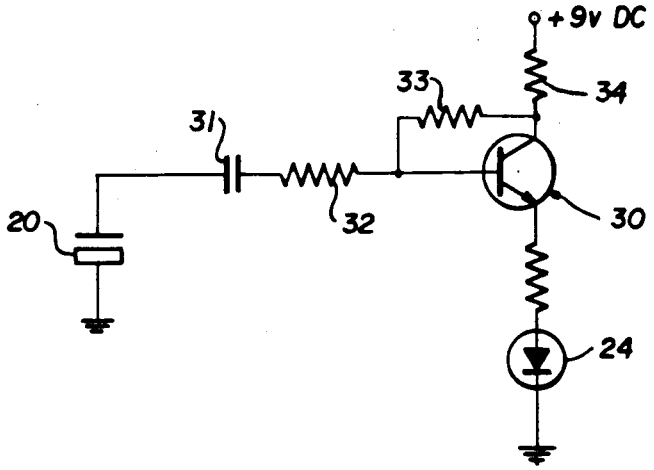
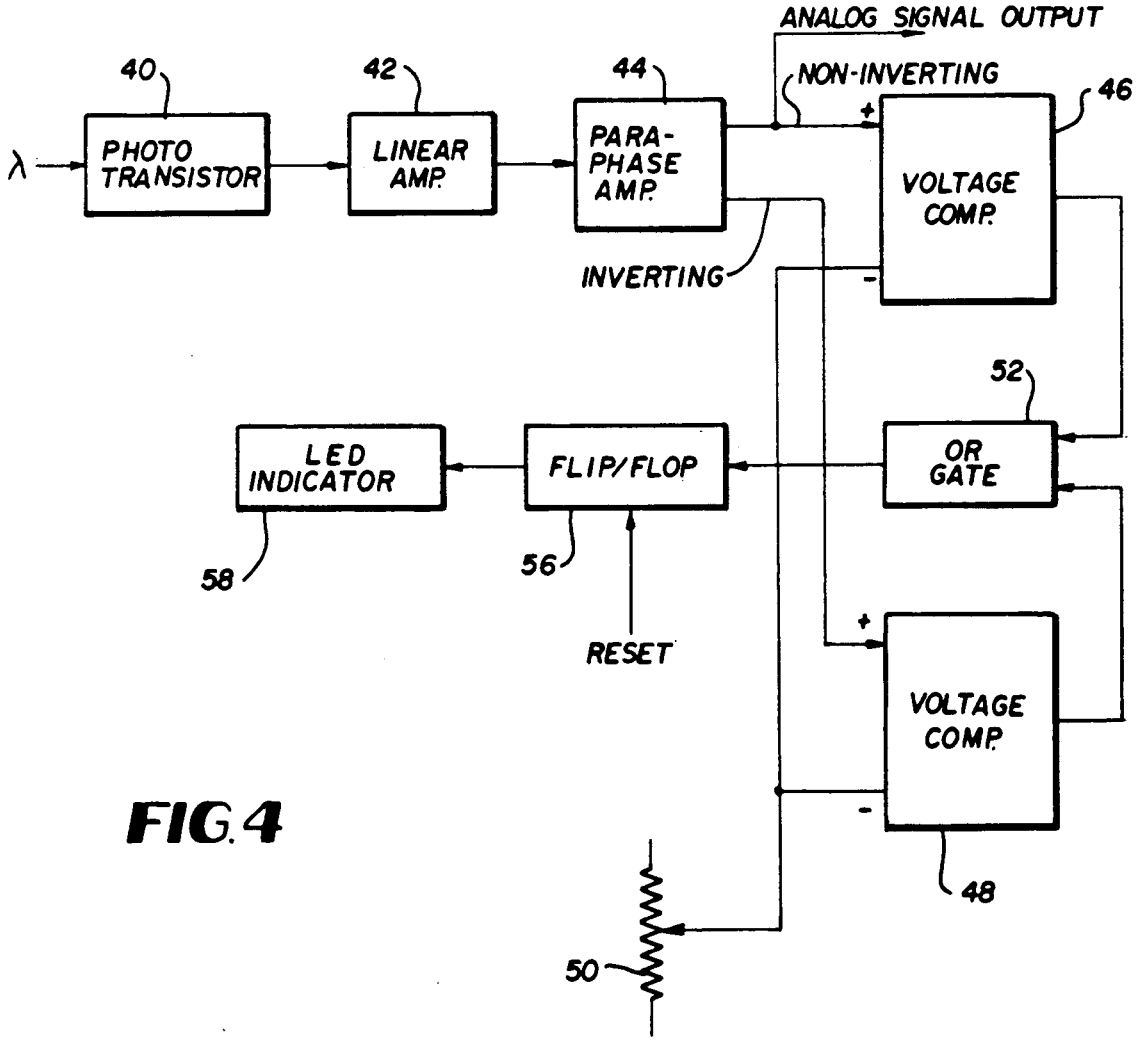
FIG. 4

FIBER OPTIC LINK FOR DETECTING MECHANICAL VIBRATION IN THE PRESENCE OF AN ELECTROMAGNETIC FIELD

The present invention is directed to an apparatus for detecting the mechanical vibration of a device which is in the presence of an electromagnetic field, and finds particular utility in the testing of land mines.

In the testing of such mines, the vibration associated with the detonation of an "inert" mine is typically detected by a sensor such as a piezoelectric accelerometer, which is a device, which when in contact with the mine will generate an electrical signal corresponding to the vibrations. In the prior art, the sensor has been connected with wires to a remote measuring station for determining information relating to the vibration, for example, whether detonation has occurred.

In some cases, the mine or other vibrating device being tested is in the presence of an electromagnetic pulse (EMP), and in fact the mine may be tested for the purpose of determining whether the pulse has caused false triggering. Additionally, the mine may be in the presence of electromagnetic interference (EMI), or lightning, which is a form of natural EMP, and these too can cause false triggering. In some situations where the mine is exposed to an electromagnetic field, the wire leads connecting the sensors to the instrumentation :nay behave as antennas, which can couple sufficient energy to damage the instrumentation, and/or couple erroneously high signals to the device under test.

In order to avoid this, the procedure for testing a land mine to determine if false triggering has occurred, is to first arm the mine and expose it to EMP, and then have testing personnel attach the sensor to the mine. However, even in the case of inert mines, attaching the sensors to the mine when armed presents a risk of injury to the person who is doing the attaching.

It is thus an object of the invention to provide an apparatus for sensing the vibration of a device in the presence of an electromagnetic field.

It is a further object of the invention to provide an apparatus for sensing such vibration without damaging test equipment or coupling unnecessary signals to the device under test.

It is still a further object of the invention to provide an apparatus for testing the effects of EMP upon a land mine which does not expose test personnel to the risk of injury.

The above objects are accomplished by providing an optical link between the sensor on the device under test and a remote data collection center. The optical link obviates the need for using wires, and hence the EMP does not interfere with the test instrumentation or the device under test. Further, in the case of a land mine, the sensor can now be connected before the mine is armed and the EMP is applied, and thus there is no risk of injury to test personnel. The apparatus of the invention has the further advantage of allowing events occurring before arming to be monitored.

The invention will be better understood by referring to the accompanying drawings, in which:

FIG. 3 is a schematic diagram of the vibration sensor and optical transmitter.

FIG. 4 is a block diagram of the optical receiver and event latch.

FIG. 6 shows the waveforms associated with the accelerometer sensor, optical receivers, and event latch wherein:

FIG. 6(*a*) shows the waveform associated with the accelerometer output.

FIG. 6(*b*) shows the waveform of FIG. 6(*a*) as inverted by the inverting channel output.

FIG. 6(*c*) shows the non-inverting channel output.

FIG. 6(*d*) shows the comparator output of the non-inverting channel.

FIG. 6(*e*) shows the comparator output of the inverting channel.

FIG. 6(*f*) shows the event latch output of the non-inverting channel.

FIG. 6(*g*) shows the manual reset.

Figure 1:
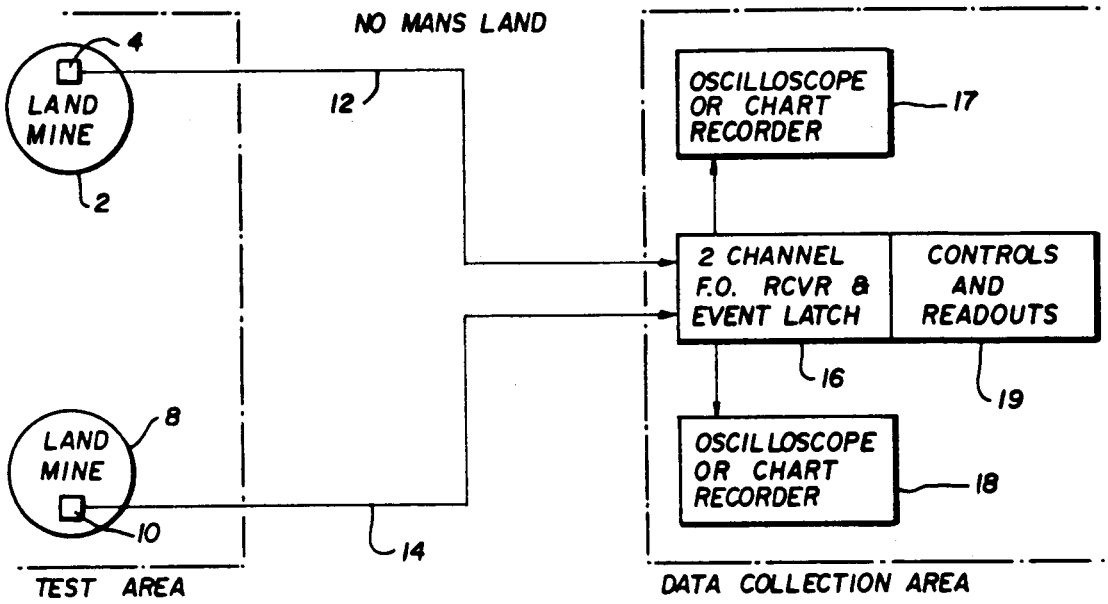
FIG. 1 is a system diagram of the apparatus of the invention.

Referring to FIG. 1, the fiber optic data link in accordance with the invention is shown. Representative land mine 2 depicted, which has a vibration sensor and fiber optic transmitter 4 secured thereto. Representative land mine 8 is also shown, with vibration sensor and optical transmitter 10 secured thereto.

The purpose of the system shown in FIG. 1 is to determine if an event has occurred at mines 2 and 8. Some events which occur in the arming process of the mine, such as extension of the trip wires, impact transient vibration to the casing of the mine. Detection of this mechanical transient is a frequently used technique for determining that an event has occurred.

The fiber optic data link shown in FIG. 1 is comprised primarily of two sensor/transmitter circuit boards 4 and 10, fiber optic cables 12 and 14, and a two channel fiber optic receiver and event latch 16. The sensor/transmitter boards convert the vibration energy, sampled from the device under test, to an analog modulated light signal which is transmitted via fiber optic cable to the fiber optic receiver and event latch. The fiber optic receiver and event latch extracts a time varying electrical signal, which is the analog of the sampled vibration, from the modulated light and sets an event latch if the peak amplitude of the extracted signal exceeds a previously adjusted threshold.

With this apparatus, it is possible to detect the occurrence of a mechanical event, measure the amplitude of the resulting vibration, and record the analog waveform of the event. Detection, measurement, and recording of the event may be done from a location physically distant from the event and the measurement apparatus will be immune to radiated and conducted electromagnetic interference. Further, the vibration sensor can be secured to the device under test as soon as is feasible, which is preferable to the prior art arrangement, where it was necessary to attach it after arming of the mine. If there is a requirement to record the time history of the mechanical event, oscilloscopes 17 and 18 may be used in conjunction with the two channel fiber optic receiver and event latch.

FIG. 1 represents a typical field test environment in which the fiber optic analog data link and event latch would be used. For the case shown, land mines, presumably inert, would be given a test to determine if the internal mechanisms of these devices will function properly. All devices of this type must complete a sequence of several internal events before they can be detonated. Some of the events in the arming process, such as extension of trip wires, impart transient vibration to the casing of the mine. Detection of this mechanical transient is a frequently used technique for determining that an event has occurred.

When the anticipated event occurs, the transient vibration analog signal is transmitted via the fiber optic cable to the receiver/event latch, which extracts the signal. If the peak voltage of the extracted analog signal exceeds the previously adjusted threshold, the event latch will be set and an event indicator light will be illuminated. The indicator light is extinguished by a manual reset.

The fiber optic analog data link and event latch is comprised of two sensor boards, two fiber optic cables, and a two channel receiver and event latch, which may be used as stand alone equipment or as components of a computer based data collection system. Where there is a requirement to monitor many scattered test points over a long interval of time, a computer based monitoring and recording system using these data links can be configured. An interface comprised of receiver/event latch cards can be readily constructed. The interface thus constructed will serve as a signal collection station and will provide a parallel digital output which can be read by a computer.

Figure 2:
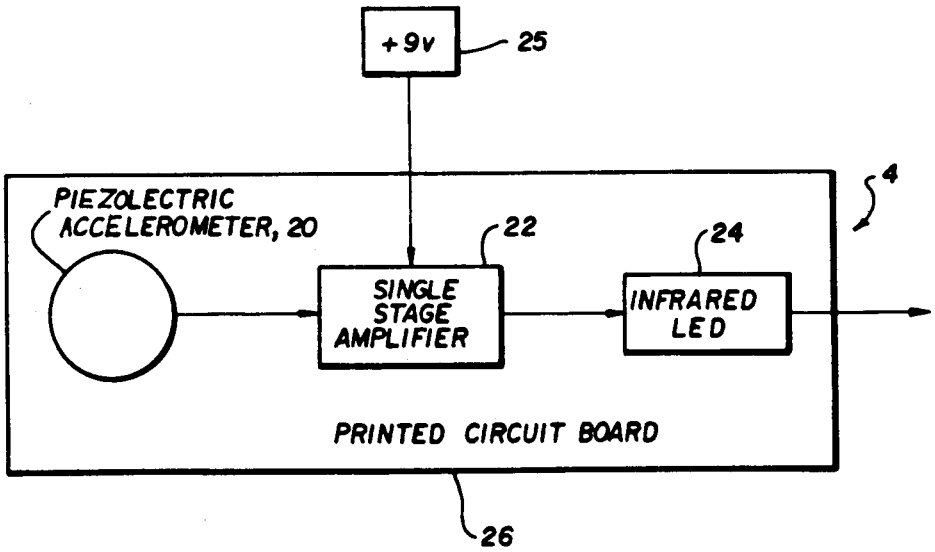
FIG. 2 is a block diagram of the vibration sensor and optical transmitter.

Referring to FIG. 2, a block diagram of the vibration sensor and optical transmitter is shown. A piezoelectric accelerometer 20 is fed to a single stage amplifier 22, which drives an infrared light emitting diode 24, which may be contained within a fiber optics cable holder.

These components are all mounted on a printed circuit board 26 having a surface area of less than 2 square inches. When in use, the entire circuit board is fastened to the surface of the device under test. Power for the circuit board is supplied by a nine volt dry cell battery which is separate from the circuit board. For example, the battery may be housed within a small plastic box which is located several inches from the board.

The piezoelectric accelerometer generates an output voltage which is proportional to the test surface accelerometer along the device axis. In the accelerometer construction, the piezoelectric element is sandwiched between two metal discs which serve as device output terminals. The device is disc shaped at its base and has a short rod shaped extension perpendicular to the surface of one disc. The lower disc, without the rod makes contact with the circuit board ground, while the upper disc, with the rod is the device output.

The single stage transistor amplifier modulates the light output of the infrared LED according to the analog voltage signal generated by the accelerometer. Referring to FIG. 3, the amplifier is comprised of an NPN silicon transistor 30 in a hybrid feedback configuration. This stage is biased to provide a stable quiescent current of 2 milliamperes through the forward biased infrared LED and operation of this amplifier can be described as linear, small signal, and class A; that is, for small signals, the entire input voltage waveform is reproduced at the output.

The infrared LED 24 with fiber optics cable holder is part of a matched pair comprised of the infrared LED and a matching infrared photodetector transistor 32. Both the infrared LED and the infrared phototransistor are encapsulated within their fiber optics cable holders and these packages are designed for printed circuit board mounting. These holders are designed to accommodate 1000 micron thick single fiber plastic cable. No fiber optic connectors are required for termination of this fiber optic cable.

The two channel fiber optics receiver and event latch 16 is remotely located at the data collection area. The receiver and event latch terminates the fiber optics cables from the two sensor/transmitters, extracts the analog signal from the modulated infrared light and sets an event latch if the amplitude of the extracted signal exceeds a voltage threshold set by a user of the device.

This optical receiver and event latch may physically be comprised of an edge mounted printed circuit card, card receptacle, power supply, and external controls and indicators. When used in the stand alone or local mode, all of these items may be mounted within a metal or plastic weatherproof box. When used in conjunction with a larger data collection system, any number of circuit cards can be incorporated into an interface.

Controls and indicators external to the circuit card would be as follows: two visible light LED even latch indicators (one per channel); two ten turn knob potentiotiometers for amplitude threshold adjustment; one manual pushbutton for event latch reset (one for both channels), and one power on/off switch.

Each fiber optic receiver and event latch circuit card may have the following set of outputs for each of the two channels:

(1) Analog voltage output—this output is used where there is a requirement to record the entire waveform of the event and an oscilloscope is available.

(2) Local event latch output—this is a digital output (1=event, 0=no event) used to drive the visible light LED.

(3) Remote event latch output. This is a digital output used when the card is incorporated into a data system interface. This output is an open collector transistor which permits interface to any logic family.

FIG. 4 is a block diagram of one channel of the optical receiver and event latch. Phototransistor 40 receives the optical signal incoming on the fiber link and converts the modulation thereon to an electrical signal. This signal is amplified by linear amplifier 42, which is followed by paraphase amplifier 44, which provides both inverted and non-inverted outputs. The inverted and non-inverted outputs are fed to an input of respective comparators 46 and 48, while a reference voltage which is outputted by threshold adjusting potentiometer 50 is fed to the other inputs of the comparators.

The outputs of the comparators are fed to OR gate 52, while the output of the OR gate is fed to flip-flop 56, the output of which is fed to LED indicator 58.

Thus, in the operation of the system, if either the inverted or non-inverted version of the signal corresponding to the detected vibration, exceeds the preset threshold, the event latch is set and the LED indicator lights.

Figure 5:
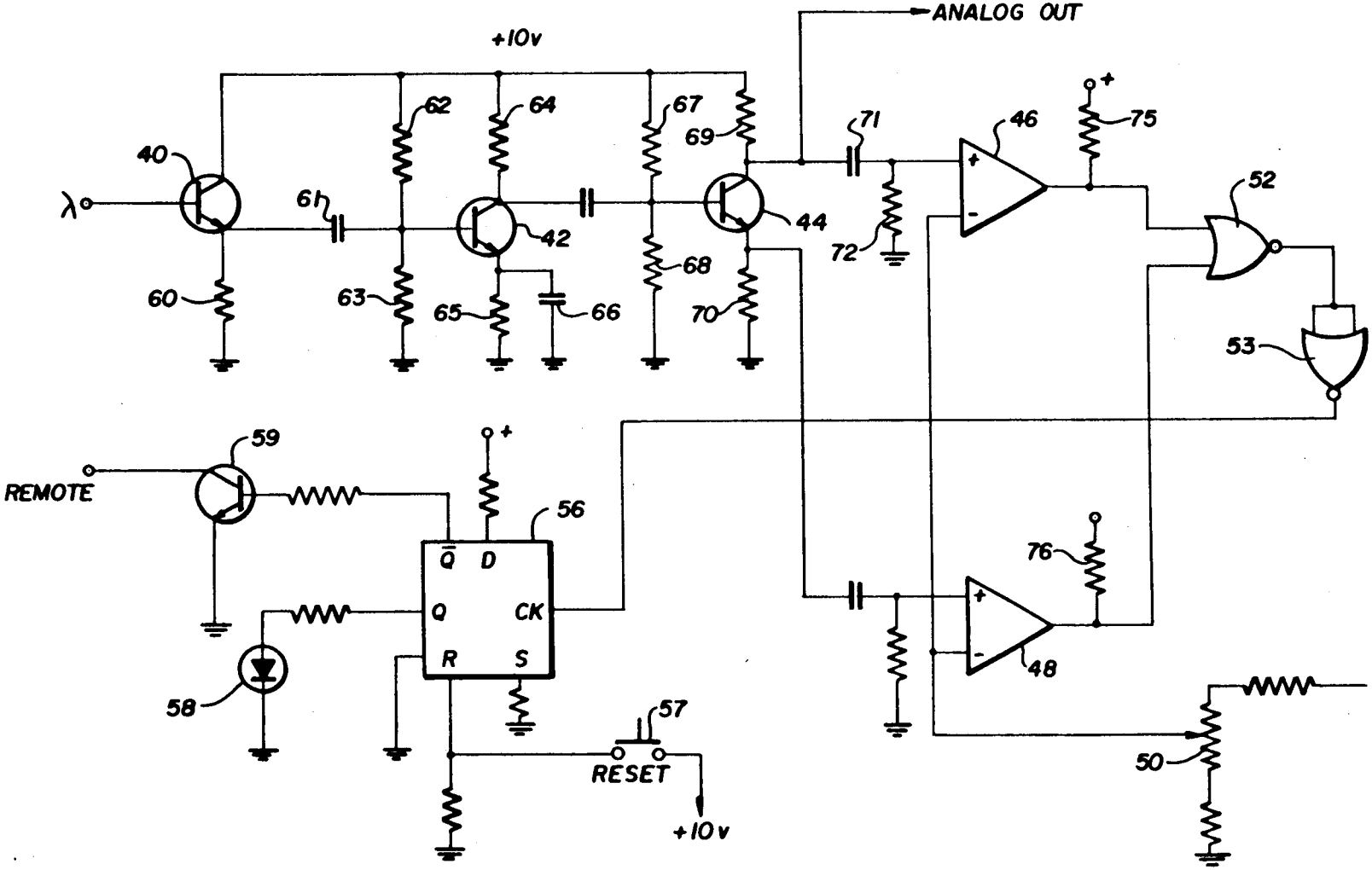
FIG. 5 is a schematic diagram of the optical receiver and event latch.

FIG. 5 is a schematic diagram corresponding to the block diagram of FIG. 4, it being noted that the other channel, which is not illustrated, is identical to that which is shown. The major components of the schematic have reference numerals which correspond to those in the block diagram described above.

Figure 6:
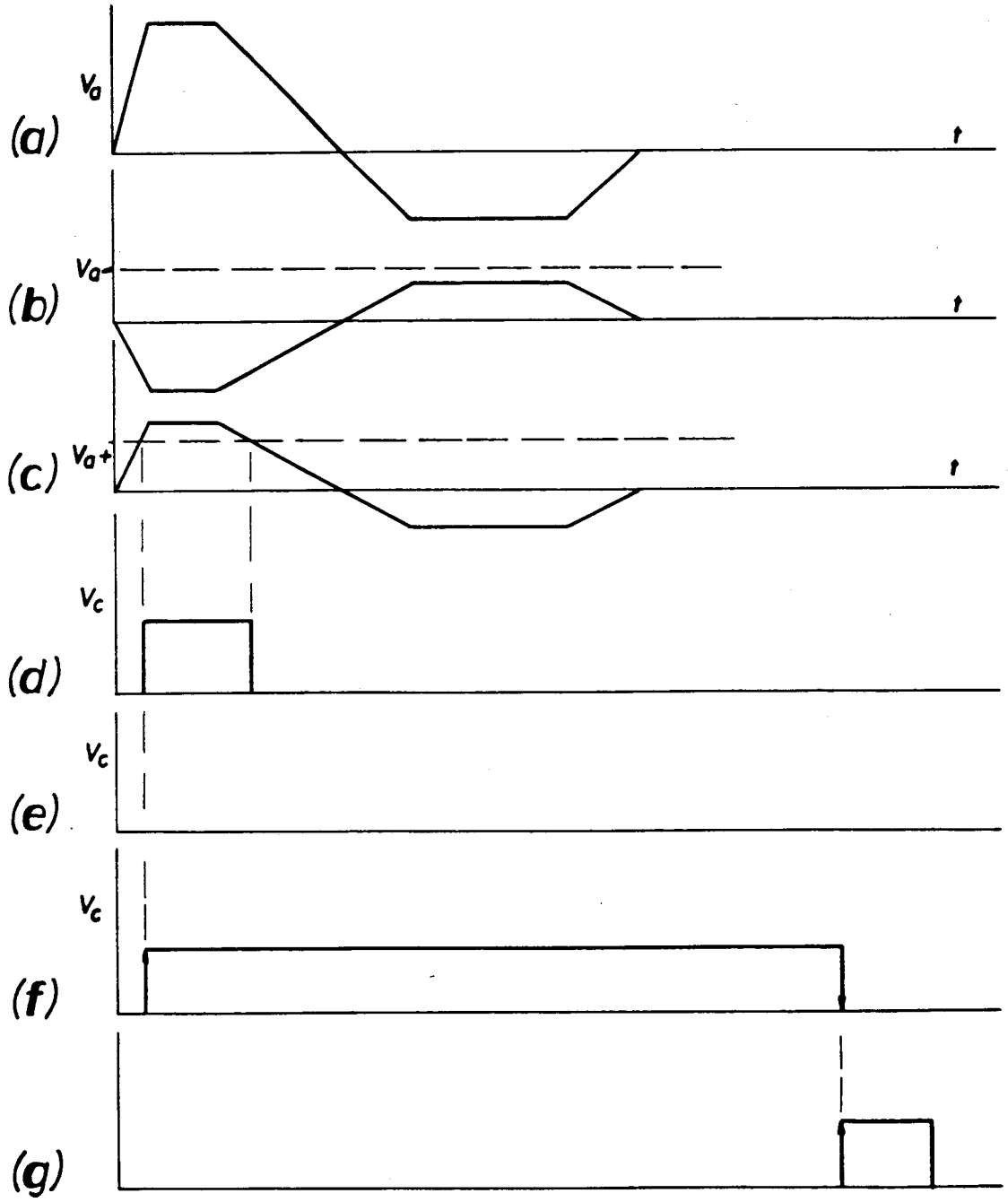

The waveform chart of FIGS. 6(*a*)–6(*g*) depict the end to end operation of the fiber optic data link and event latch in response to a hypothetical mechanical transient. In the case shown, the accelerometer output voltage response is trapezoidal in shape with both positive and negative excursions, and this waveform is shown in FIG. 6(*a*). This waveform was chosen purely for convenience; actual responses of the accelerometer to various stimuli will be complex waves some of which may approximate a trapezoid. In general, these responses will be composed of damped sinusoids and their harmonics.

The waveform chart shows the response of the accelerometer and the corresponding responses of circuits within the fiber optic receiver and event latch. Thus, FIGS. 6 (*b*), (*c*), (*d*), (*e*), and (*f*) show the outputs of the two stage amplifier, the voltage comparator responses, the event latch output and the manual reset respectively. In these Figures, Va is the accelerometer voltage, Va− and Va+ are its inverted and non-inverted counterparts, while Vc is the comparator voltage. In the case shown, the positive voltage excursion of the non inverting amplifier output shown in FIG. 6(*c*) exceeds the previously adjusted voltage threshold. Consequently, the comparator responds as shown in FIG. 6(*d*) and sets the event latch as shown in FIG. 6(*f*). For the inverting channel, the positive output excursion does not cross the threshold, therefore the comparator does not respond. The event latch may remain in the "on" state indefinitely and must be reset as per FIG. 6(*g*).

Although the fiber optic coupled analog data link and event latch has the potential for widespread use in the testing of land mines, a wide variety of other uses may be considered. Thus, whenever there is a requirement to detect or mechanically measure vibration in the presence of strong electromagnetic fields, the fiber optically coupled analog data link and event latch may be used. The need to measure mechanical vibration, either transient or steady state, in the presence of strong electromagnetic fields, often arises in functional upset testing of electronically controlled electromechanical equipment. Examples of equipment and devices that may be functionally tested in an electromagnetic environment would include electronically regulated DC motors, antenna positioning systems, and power fault sensing modules. Typically, the equipment under test would be subjected to a controlled electromagnetic disturbance (i.e., simulated EMP) to momentarily de-stabilize the system and this would result in a measurable mechanical transient. Electronically controlled rotating machinery would respond with a momentary change in rotational speed, and the position control system would respond with an angular displacement followed by damped oscillation. With the fiber coupled data link and event latch, it would be possible to relate an electromagnetic disturbance measured in some units convenient to the tester (e.g., kilovolts per meter, or amperes per meter) to a measureable angular or linear displacement and the measuring instrumentation would be completely immune to the applied electromantic disturbance.

The specific test described above for land mines is by no means the only ordnance device test having the requirement to detect a timed or induced mechanical event. Tests of this type are frequently conducted by various defense laboratories and test facilities, and use of the piezoelectric accelerometer is widespread. Despite widespread use of the same generic sensing device, test peculiar recording and event latching systems are frequently developed. This, of course, leads to unnecessary developmental work with its attendant delay, risk, and expense. The purpose of this invention is to provide a partial remedy by making available to appropriate users standard hardware building blocks from which test peculiar instrumentation systems can be readily constructed. The above described analog data link and event latch has the potential to become a standard design which, if adopted, may eliminate much unnecessary developmental work.

There thus has been described an improved apparatus for detecting mechanical vibrations in the presence of an electromagnetic field.

While the invention has been described in accordance with illustrative embodiments, it should be understood that variations will occur to those skilled in the art, and the scope of the invention is to be limited only by the claims appended hereto and equivalents thereof.

I claim:

1. An apparatus for detecting the mechanical vibration of an explosive device in the presence of an electromagnetic field, comprising, an explosive device which is capable of producing mechanical vibration upon arming, means located in proximity to said explosive device for sensing said vibration while being subjected to an electromagnetic field, and for generating an electric signal corresponding thereto, optical transmitter means located in proximity to said explosive device for generating a light wave signal corresponding to said electrical signal, optical receiver means disposed at a location remote from said explosive device for receiving said light wave signal and generating an electrical signal corresponding thereto, an optical fiber link connecting said optical transmitter means and optical receiver means, and means responsive to said electrical signal generated by said optical receiver means for indicating information about said mechanical vibration which is produced by said explosive device, whereby said optical fiber link prevents the coupling of energy produced by the electromagnetic field from interfering with said indicating means and said explosive device.

2. The apparatus of claim 1 wherein said device comprises a land mine.

3. The apparatus of claim 1 wherein said means for indicating information about said mechanical vibration comprises means for indicating whether the magnitude of the electrical signal generated by said optical receiver means exceeds a preset threshold value.

4. The apparatus of claim 1 wherein said means for indicating comprises means for displaying the electrical signal generating by said optical receiver means.

5. The apparatus of claim 1 wherein said means for generating an electrical signal corresponding to said vibration comprises a piezoelectric accelerometer.

6. The apparatus of claim 1 wherein said optical transmitter means comprises means for generating a light wave signal in the infrared frequency range.

7. The apparatus of claim 3 wherein said means for indicating whether the magnitude of the electrical signal exceeds a preset threshold value, comprises, means for amplifying the signal provided by the optical receiver means, means for providing inverted and non-inverted versions of the amplified signal, two comparator means for comparing the inverted signal and the non-inverted signal with the present threshold value, means for feeding the inverted signal to an input of one comparator means and the non-inverted signal to an input of the other comparator means, OR gate means for receiving the outputs of both comparator means, and means responsive to the output of the OR gate means for providing an indication of whether the magnitude of the signal provided by said optical receiver means exceeds a preset minimum.

* * * * *